(12) United States Patent
Makhija et al.

(10) Patent No.: US 11,354,621 B2
(45) Date of Patent: Jun. 7, 2022

(54) SUPPLY CHAIN MANAGEMENT SYSTEM AND A METHOD OF OPERATING THE SAME

(71) Applicant: NB Ventures, Inc., Clark, NJ (US)

(72) Inventors: Subhash Makhija, Westfield, NJ (US); Ramachander Raja, Scotch Plains, NJ (US); Shivendra Singh Malik, Vasco-da-Gama (IN); Santosh Ganesh Dattatraya Bhat, Wadala East (IN)

(73) Assignee: NB VENTURES, INC., Clark, NJ (US)

( * ) Notice: Subject to any disclaimer, the term of this patent is extended or adjusted under 35 U.S.C. 154(b) by 365 days.

(21) Appl. No.: 16/271,187

(22) Filed: Feb. 8, 2019

(65) Prior Publication Data
US 2020/0258031 A1      Aug. 13, 2020

(51) Int. Cl.
*G06Q 10/08* (2012.01)
*G06Q 30/06* (2012.01)
*G06N 5/02* (2006.01)

(52) U.S. Cl.
CPC ............ *G06Q 10/087* (2013.01); *G06N 5/02* (2013.01); *G06Q 30/0637* (2013.01)

(58) Field of Classification Search
CPC ..... G06Q 10/087; G06Q 30/0637; G06N 5/02
See application file for complete search history.

(56) References Cited

U.S. PATENT DOCUMENTS

2017/0357249 A1* 12/2017 Sandler ................. G06Q 10/00
2018/0227627 A1*  8/2018 Jabara ................... H04W 60/00

* cited by examiner

*Primary Examiner* — Rokib Masud
(74) *Attorney, Agent, or Firm* — David M. Breiner; BrownWinick Law Firm (57) ABSTRACT

The present invention provides Artificial Intelligence, Internet of things and blockchain based systems and methods for supply chain management. The system and method identify reasons of failure of procured item/object based on performance data analysis. The system and method further determine optimization characteristics required for a required item/object based on Artificial intelligence analysis using prediction algorithms.

18 Claims, 4 Drawing Sheets

SUPPLY CHAIN MANAGEMENT SYSTEM AND A METHOD OF OPERATING THE SAME

BACKGROUND

1. Technical Field

This disclosure relates generally to supply chain management. More particularly, this disclosure relates to Artificial Intelligence, Internet of things and blockchain based systems and methods for supply chain management.

2. Description of the Prior Art

In any organization, procurement plays a very significant role in analyzing its expenditures, savings and profits. Further, the analysis of procured devices can help in taking measures for reducing expenditures, maximizing savings, making key business decisions etc. In most organizations, goods and services are procured from various service providers and it becomes tedious to get insights from the data about the quality of items being procured. Identifying the appropriate suppliers and characteristics associated with items being procured can help in making key decisions related to business.

Various challenges are faced during different phases of a supply chain management cycle due to the characteristic of such items being procured, the data associated with the items, the transactions have very less information about the services procured from a vendor/service provider, absence of vendor name in the transactional records, absence of invoice description, purchase order description, material description, general ledger account information, redundant transactions in the data and inconsistencies in data occurred at the time of data entry. Also, in data analysis, even though the specification data of the items being procured contains some information, such information is of very little assistance to be used directly as the actual environment under which the item is functional keeps varying.

In case an element of a commodity to be procured is dysfunctional, the entire commodity is to be replaced unless the failed element is identified. Inventory management is relied on by organization in supply chain management to replace any failed item or its element. However, if there is no analysis of the reasons of failure then the replaced item or element may still not help. Even if some data analysis is done on basis of limited information available from the manufacturer or supplier, it does not provide accurate results. Further, maintaining a high inventory of similar items incurs huge costs for the organization and the suppliers.

There are prevailing arts on supply chain management, however, none of the existing prior arts provide a supply chain management system and method that enables procurement of items or associated elements based on the actual requirement of the working environment.

The conventional supply chain management systems for procurement and distribution of items has been most inefficient process that wastes a considerable number of items, a significant amount of consumers time, and limits the conveniences that can be offered to consumers.

Accordingly, there is a need in the art for improved systems and methods of supply chain management.

SUMMARY OF THE INVENTION

Accordingly, this disclosure provides a method of operating a supply chain management system. The method includes procuring at least one item/commodity/direct material based on an input from a user, storing specification/details of the at least one procured item in a data block of a blockchain wherein the blockchain includes a plurality of linked data blocks with multiple branches. The method further includes the step of assigning at least one IOT device to the at least one item/commodity monitoring and capturing in real-time one or more performance data of the at least one commodity/item/direct material using the at least one IOT device; transmitting and storing the captured one or more performance data in the data block; in response to a dysfunction of the at least one item, sending an automated signal to a processor for initiating analysis of an aggregate performance data pattern of the at least one item/commodity/direct material; determining at least one optimization characteristic of a required item to replace the at least one commodity/item on dysfunction for enhanced performance wherein a plurality of backend scripts is created by a bot based on the data pattern and AI processing to determine the optimization characteristics; identifying the required item from an item master database; and procuring the required item and storing the details of the required item in at least one blockchain element extending from the data block. The at least one element is the extension of the blockchain to accommodate for data of the required item without removing, modifying or altering the specification data of the procured items. The at least one element is determined based on at least one data model generated by the AI engine for analyzing the performance data. The data model is built using natural language-based text including a training set created by collection of natural language text for item information and corresponding system information related to a sub-system. The collection of natural language text for item information is analyzed and processed in the training set for associating information of an item with the dysfunctional item. Upon dysfunction, the at least one element of the blockchain is identified based on the data model and the identifier associated with the failed item.

In an embodiment, a supply chain management system is provided that comprises a cloud based IOT network and a blockchain distributed network. The cloud based IOT network includes a plurality of IOT devices in communication with each other wherein the devices are configured for tracking, capturing, processing, transmitting and receiving performance data of a plurality of items/devices/direct materials procured through a supply chain network; and at least one server having at least one AI engine configured to process performance data received from the plurality of IOT devices to identify a data pattern for determining optimization characteristics of the items wherein a plurality of backend scripts is created by a bot based on the data pattern and AI processing to determine the optimization characteristics. The blockchain distributed network, in this embodiment, is integrated with the cloud based IOT network. The blockchain distributed network includes a plurality of linked data blocks forming a blockchain with multiple branches configured for storing specification/characteristic data of the plurality of items/objects/direct materials procured; wherein the data blocks include information related to working environment of the items/objects/direct materials, performance data of the items/devices being tracked and recorded in blocks, at least one element each connected to the multiple branches of the blockchain for storing dynamically changing performance data and the optimization characteristics of the plurality of items wherein the data and characteristics change when at least one item of the plurality of items is replaced by at least one required item after dysfunction, wherein the at least one AI engine analyzes the performance data of the item with the required item to determine the at least one element to which the specification data, optimization characteristics and performance data of the item with the required item is to be appended.

In another embodiment, an IOT network-based supply chain management system is provided. In this embodiment, the network comprises a plurality of IOT devices configured to communicate with each other wherein the IOT devices include: at least one sensor attached to at least one item for sensing operating parameter information to determine performance data pattern associated with the item, a communication device configured to receive the sensed operating parameter information and process the information before transmitting; and at least one server having at least one AI engine configured to process performance data received from the plurality of IOT devices for determining optimization characteristics of the items and store it in a block chain wherein a plurality of backend scripts is created by a bot based on the performance data pattern and AI processing for determining the optimization characteristics.

In another embodiment a blockchain network for a supply chain management system is provided. In this embodiment, the system includes a plurality of linked data blocks forming a blockchain with multiple branches configured for storing a specification/characteristic data of a plurality of procured items/devices/materials; wherein the data blocks include information related to working environment in which the items/devices/materials are being used, performance data pattern of the items/devices being tracked and recorded in blocks, at least one element each connected to the multiple branches of the blockchain for storing dynamically changing performance data of the plurality of items wherein the data changes when at least one item of the plurality of procured items is replaced with a required item after dysfunction; and at least one AI engine for analyzing the performance data pattern of the procured item with the required item to determine the at least one element to which the specification data, optimization characteristics and performance data of the item with the required item is to be appended wherein a plurality of backend scripts is created by a bot based on the performance data pattern and AI processing for determining the optimization characteristics.

In another embodiment, an AI based Supply chain management system is provided. The system includes at least one IOT device configured for capturing and transmitting at least one performance data of an item to a blockchain, a monitoring engine configured to learn a performance data pattern of the item based on the captured performance data. The system further includes at least one AI engine coupled to a processor configured to process a prediction algorithm to determine at least one optimization characteristic of the item based on an aggregate data pattern, and an item master database including a consolidated list of elements from multiple suppliers wherein the AI engine identifies a required item from the list based on the at least one optimization characteristic determined to enhance the performance of the item wherein a plurality of backend scripts is created by a bot based on the performance data pattern and AI processing for determining the optimization characteristics.

The present invention provides several advantages over the prior art. For example, in one advantageous aspect, the present invention provides a system and method for supply chain management with faster processing times, reduced error and accurate determination of optimization characteristics. The system utilizes sub network of devices and server for secured communication with reduced processing time due to automatic creation of scripts by a bot utilizing AI processing to minimize the processing steps for determination of optimization characteristics thereby reducing overall time of a supply chain management operation and increasing efficiency. The system includes creation of scripts based on continuously monitored performance data patterns and impact analysis of neighboring sub-components of a failed item for accurate determination of optimization characteristics. All of this results in a significant improvement in the overall functioning of a computer system.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Described herein are nonlimiting example embodiments of the present invention, which includes Artificial Intelligence, Internet of things and blockchain based systems and methods for supply chain management.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "optimization characteristics," "specification," or "performance data," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to systems and method for supply chain management by artificial intelligence, Internet of things and blockchain based technology.

Figure 1:
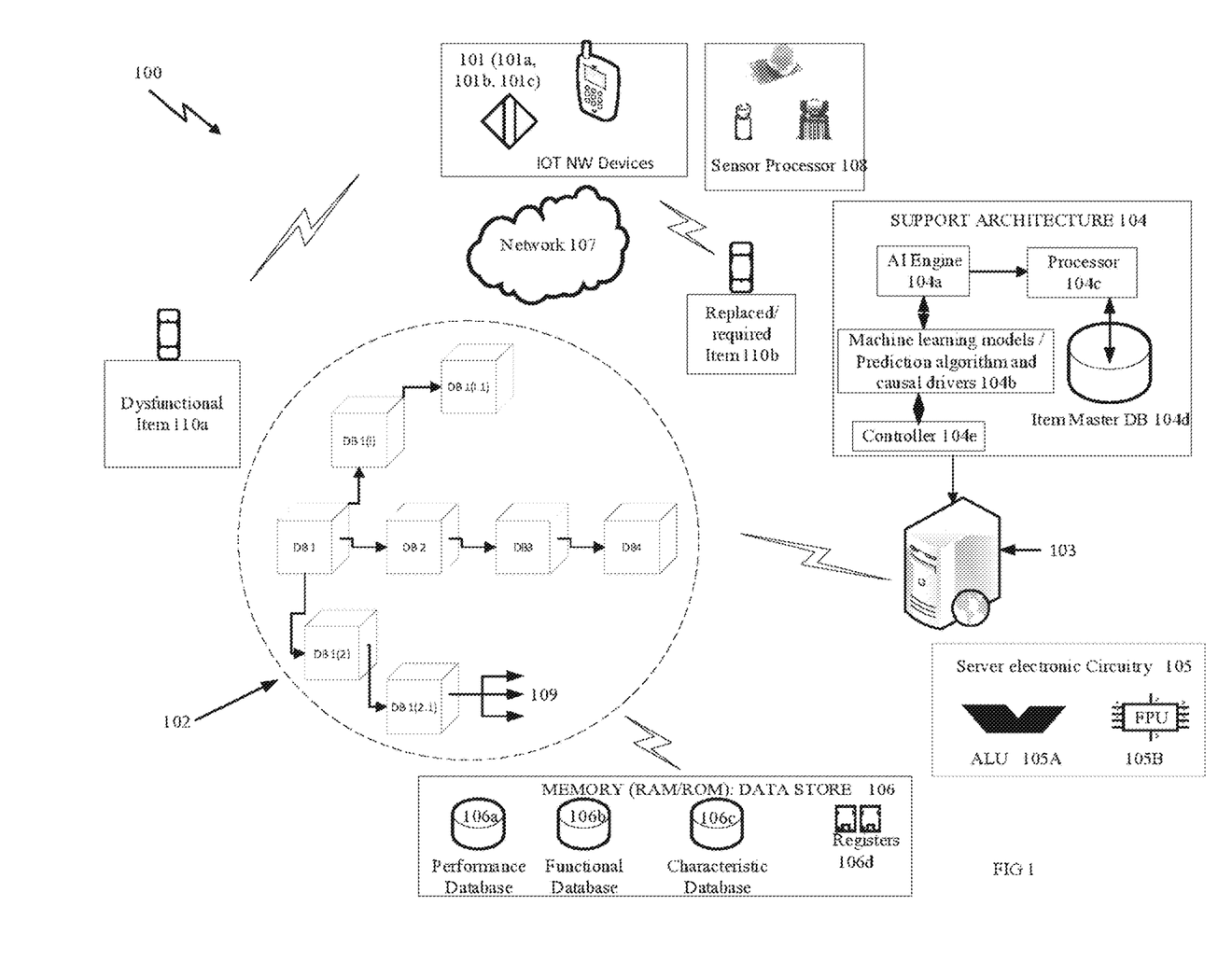
FIG. 1 is a view AI, IOT and blockchain based supply chain management system in accordance with an embodiment of the invention.

Referring to FIG. 1, a supply chain management system 100 is provided in accordance with an embodiment of the present invention. The system 100 includes a cloud based IOT network 101 and a block chain distributed network 102. The cloud based IOT network includes a plurality of IOT devices (101a, 101b, 101c) in communication with each other. The devices (101a, 101b, 101c) may be configured for tracking, capturing, processing, transmitting and receiving performance data of a plurality of items/objects/direct materials 110 (110a, 110b) procured through the supply chain network. The system 100 also includes at least one server 103 with support architecture 104 for performing AI based operations. The support architecture 104 includes at least one AI engine 104a configured to process performance data received from the plurality of IOT devices (101a, 101b, 101c) for determining optimization characteristics of the items. The optimization characteristics of the items may include data related to tolerance, material, configuration matching including dimensions, etc.

In an embodiment the IOT devices (101a, 101b, 101c) are configured to transmit a performance data relevant to at least one procured item 110a coupled to the at least one IOT device. The IOT devices (101a, 101b, 101c) may be in secured communication with the at least one server 103 as part of the sub network.

In an example embodiment, the IOT devices (101a, 101b, 101c) may be a tracking device, an intelligent sensor, a smartphone, laptop, PC, an image capturing device, a smart watch or a combination thereof.

The support architecture 104 performs AI based operation to determine replacement item/object 110b with desired characteristics based on optimization characteristic data. The system 100 includes a memory data store 106 for accessing performance data, characteristic data and scripts of prediction algorithm etc. to be processed based on AI. The system 100 connecting various elements through a network 107. The network 107 enables formation of sub networks depending on the requirement of the supply chain management operation.

In an embodiment, the IOT devices 101 may communicate with the server 103 wirelessly through communication interface, which may include digital signal processing circuitry. Also, the IOT devices 101 may be implemented in a number of different forms, for example, as a smartphone, computer, personal digital assistant, or other similar devices. The IOT devices (101a, 101b, 101c) may include sensor processors 108 with internal circuitry that may include processor, memory and storage device.

In an exemplary embodiment the sensor processor 108 is used as a main processor in IoT (internet-of-thing) device for the rare sensing applications. The IoT device including the proposed sensor processor may perform event-driven sensor data processing based on an accuracy-energy configurable event-quantization in architectural level.

In an embodiment the server 103 of the invention may include various sub-servers for communicating and processing data across the network. The sub-servers include, but are not limited to, content management server, application server, directory server, database server, mobile information server and real-time communication server.

In an example embodiment, the server 103 may include electronic circuitry 105 for enabling execution of various steps by a processor 104c of the server 103. The electronic circuitry 105 has various elements including but not limited to a plurality of arithmetic logic units (ALU) 105A and floating-point Units (FPU) 105B. The ALU 105A enables processing of binary integers to assist in formation of prediction algorithms where a sequence of performance data of the items is analyzed to determine an optimization characteristic of a replacement item 110b for ensuring longevity of operations in industry. In an example embodiment, the server electronic circuitry 105 as shown in FIG. 1, may additionally include other processors, memory, storage devices, high-speed interfaces connected through buses for connecting to memory and high-speed expansion ports, and a low speed interface connecting to low speed bus and storage device. Each of the components of the electronic circuitry 105 are interconnected using various busses and may be mounted on a common motherboard or in other manners as appropriate. The processor 104c can process instructions for execution within the server 103, including instructions stored in the elements of the memory data store 106 like memory or on the storage devices to display graphical information for a GUI on an external input/output device, such as display coupled to a high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an example embodiment, the support architecture 104 of the system 100 includes a controller 104e encoded with instructions enabling the controller 104e to determine optimization characteristic for the replacement items 110b based on the prediction algorithms 104b. The system also includes a processor 104c configured to process various functions based on the AI based processing of information in item master database 104d by the bot. The support architecture 104 may also include a data manager for managing data relating to an item/object. In an example embodiment, the data may include specification/characteristic data of the item/object.

The processor 104c may be implemented as a chipset of chips that include separate and multiple analog and digital processors. The processor 104c may provide coordination of the other components, such as controlling user interfaces, applications run by devices, and wireless communication by devices.

The processor 104c may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor 104c. In addition, an external interface may be provided in communication with processor 104c, so as to enable near area communication of device with other devices. External interface may provide, for example, for wired communication in some implementations, or for wireless communication in other implementations, and multiple interfaces may also be used.

In an example embodiment, the memory data store 106 includes plurality of databases as shown in FIG. 1. The data store 106 includes an item/object performance database 106a for storing the performance data of an item/object being monitored, a functional database 106b for storing a library of functions enabling creation of prediction algorithms depending on analysis of performance data, characteristic data etc. using AI engine 104a, an item/object characteristic database 106c for storing specification/characteristic data of items/objects. The memory data store 106 includes a plurality of registers 106d for temporarily storing data received from various IOT devices to enable transfer of performance data by a processor between the databases as per the instructions of the AI engine 104a to determine prediction algorithm for obtaining optimization characteristics.

The memory data store 106 may be a volatile, a non-volatile memory or memory may also be another form of computer-readable medium, such as a magnetic or optical disk.

The memory store 106 may also include one or more storage devices capable of providing mass storage. In one implementation, at least one of the storage devices may be or contain a computer-readable medium, such as a floppy disk device, a hard disk device, an optical disk device, a tape device, a flash memory or other similar solid-state memory device, or an array of devices, including devices in a storage area network or other configurations.

Figure 1A:
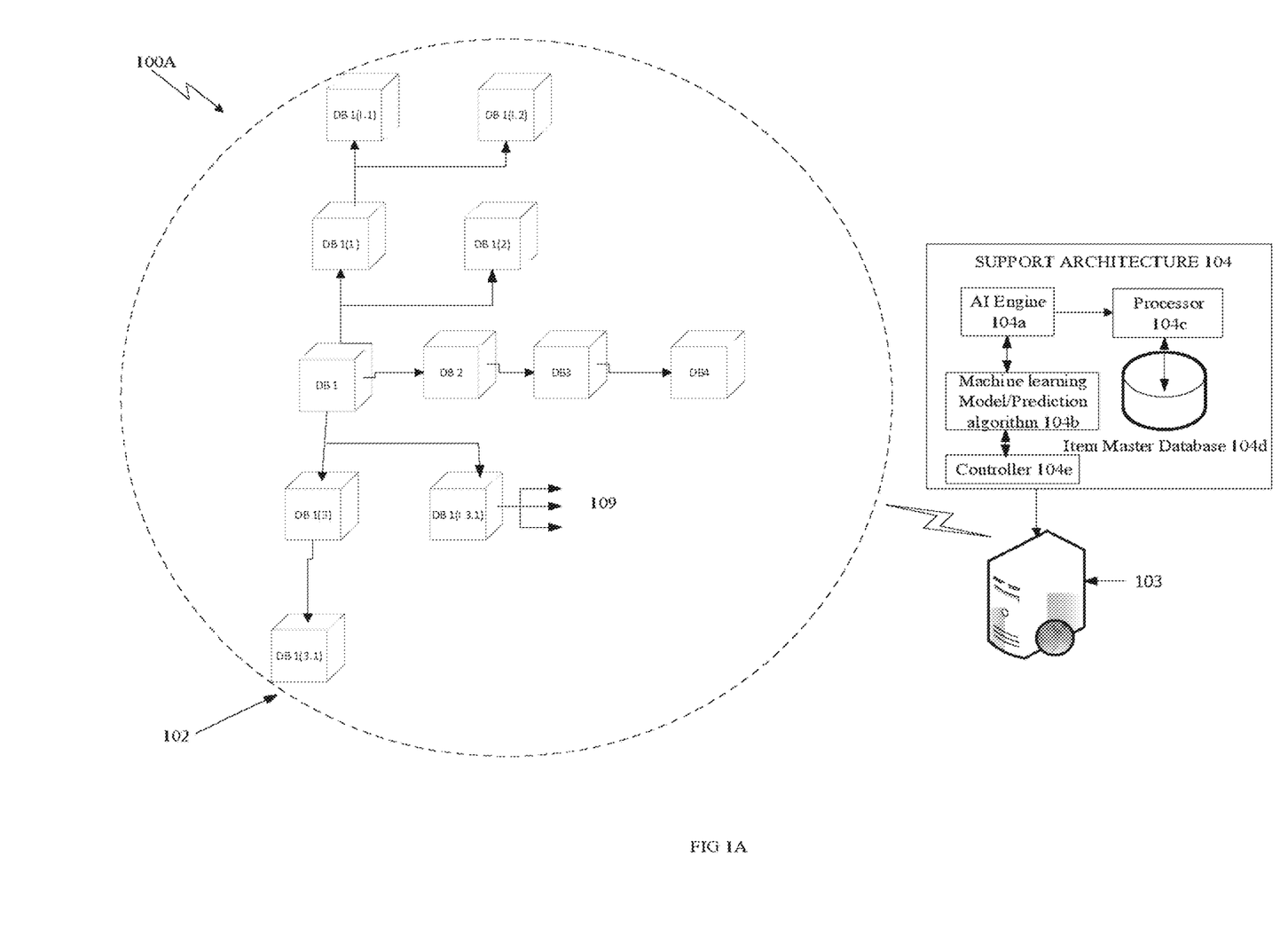
FIG. 1A is a view of a sub network of the AI, IOT and blockchain based system in accordance with an embodiment of the invention.

In an example embodiment of the invention, the system 100 provides a sub network 100A as shown in FIG. 1A. The sub-network 100A includes the at least one server 103 in communication with a blockchain network 102 for transferring and storing relevant item related data in a block. The item related data includes a cumulative performance related data of the item/object, characteristic data of procured item/object and optimization data of a required item/object in a chain of blocks (DB 1, DB 1.1, DB 1.1.1, DB 1.1.2 etc.) to be accessed anytime in future. Further, when the item is replaced the data related to a new item/object replacing a failed item is stored in a blockchain element 109 of the chain of blocks thereby enabling storage of related items at a linked block. Since, the storage is sequential, but the process need not be sequential, it provides the advantage of storing related data by linking with block at any time regardless of when the replacement process starts. Further, at least one data model generated by the AI engine for analyzing the performance data enables determination of at least one element extending from a data block of the blockchain, where the related data is linked to the element of the blockchain. The data model is built using natural language-based text including a training set created by collection of natural language text for item information and corresponding system information related to a sub-system. The collection of natural language text for item information is analyzed and processed in the training set for associating information of an item with the dysfunctional item. Upon dysfunction, the at least one element of the blockchain is identified based on the data model and the identifier associated with the failed item.

In another embodiment, other sub networks like sub networks between IOT devices and at least one server with the support architecture are provided. The IOT devices including sensors, smartphone etc. captures the real-time performance data of items in a working environment and transmits the data to the server with support mechanism for analysis of the data. The process of analysis is dynamic and saves time in determining optimization characteristic of an item upon failure. The AI engine-based processing logic integrates deep learning, predictive analysis, information extraction, planning, scheduling, impact analysis and robotics for analysis of the data to determine optimization characteristics.

In an exemplary embodiment, the server includes a front end web server communicatively coupled to at least one SQL server, wherein the front end web server is configured to reprocess the data pattern based on the plurality of backend scripts by receiving the data pattern processed by the SQL server and applying the AI based dynamic processing logic to the data pattern to determine the optimization characteristics and automating procurement of the required item.

It shall be apparent to a person skilled in the art that various sub networks performing different functions may be part to an integrated supply chain management system.

In an exemplary embodiment, the optimization characteristics are determined based on an impact analysis of a plurality of sub-components working in conjunction with the failed components. The IOT devices transmit data of each sub-component to the server and upon failure of an item, the sub-component data is analyzed to determine real working environment impact of these sub-components on the failed items. The impact analysis and analysis of data of the failed item enables creation of data pattern scripts by a bot based on AI based processing logics. The scripts utilize dynamically created prediction algorithms based on AI based processing of the data patterns. The bot analyzes working cases, activity diagrams, sequence diagrams and behaviors of the items under working environment for creating the scripts automatically. The bot analyzes data patterns in the application and processes it based on the various characteristics associated with these data patterns like location of each item, associated functions of each item, impact of sub-components on dysfunctional items, processing time of the functions and probability of success of a replaced required item having that optimization characteristic that is determined from the analysis of the data patterns. The data patterns are combination of various functions and characteristics that are analyzed to determine the required item optimization characteristics within reduced steps in finite time.

In an example embodiment, the AI engine is configured to select appropriate performance data from the aggregate data which needs to be analyzed for determining the optimization characteristics. The appropriate performance data includes a data when the performance of the failed item dipped over a course of period or at specific time interval under specific environmental conditions, also considering when the impact of the neighboring sub-components was extreme to cause wear and tear of the failed item. Such, instances of a dip in performance are identified by the AI engine utilizing a bot that automates the process. The analysis of the appropriate data by a bot enables faster processing of the data.

In a related embodiment, comparison of reasons of dysfunction of the item including impact of neighboring items, aggregate data and appropriate performance data etc. to identify an optimization characteristic requires a finite amount of processing time on a computer processor. Thus, by restraining comparison and analysis using AI to select appropriate performance data and impact analysis data while simultaneously satisfying the needs of obtaining accurate results, data patterns are organized/processed depending on the demands of the computing resources, which allow more data of different dysfunctional items to be processed with same resources (e.g., disk space, processor speed, memory, etc.). Thus, the net result of the claimed invention improves the functioning of a computer with logical processes.

In an exemplary embodiment, a plurality of backend scripts is created by the bot based on the data patterns and AI processing for enabling automation of sub-processes to identify the appropriate data patterns for determining optimization characteristics.

In example embodiments, the bot is a software bot or a combination of a software and hardware bot. In an embodiment, the software bot is a computer program enabling a processor to perform faster analysis by utilizing AI. In another embodiment, the bot as a combination of hardware and software, where the hardware includes memory, processor, controller and other associated chipsets especially dedicated to perform functions that enable faster processing of supply chain management operations.

In an example embodiment, the sub network 100A includes communication between various network components like sub-servers, TOT devices associated with multiple items for analyzing performance data of each of the items coupled to the TOT device. The sub network 100A enables interlinking of items to analyze performance data of different items and simultaneously also enables processing of optimization characteristics of identified item to be replaced thereby ensuring accurate analysis of reasons of failure of the item, other affected items working in conjunction with the dysfunctional item and determining accurate optimization characteristics of the required item based on analysis of different performance data of other multiple items by utilizing the other network components of the sub-network.

In an exemplary embodiment, the TOT device may be an image capturing device configured to capture image of the item under working condition periodically. The image is converted to text data using image processing before generating data patterns where the plurality of backend scripts created by the bot based on the data pattern and AI processing determines the optimization characteristics.

In example embodiments, some systems include supplier management operations, procurement operations, inventory management operations, account payable operations etc. These systems may organize the supply chain between manufacturers and service providers. In a nonlimiting example embodiment, the blockchain and AI system includes elements that enable management of end-to-end supply chain information such as demand planning, order fulfillment, scheduling, inventory, etc based on constant monitoring and analysis of the procured objects/item and its performance data.

In an example embodiment, AI and blockchain based analysis with multiple manufacturers and service providers is facilitated. Some of the advantages of the present system include the fact that economies of scale are enabled, procurement and inventory are rationalized, distribution and logistics facilities are rationalized, and the development of an industry-wide standard is facilitated.

In an embodiment, the demand and supply of manufacturer offerings are planned to utilize the sub network in operation and orders for the manufacturer offerings are also managed utilizing the sub network with server and IOT devices in communication with each other for information capturing and exchange. The sub network is also utilized to manage sub network assets including providing maintenance and service for the sub network assets utilizing the sub network.

In one of the advantageous aspects of the present invention, the IOT, AI and blockchain based supply chain management system provides revenue enhancement, cost reduction and capital reduction by efficient utilization of resources with reduced timelines due to monitoring and analysis based on performance data of a procured item/object.

In a related aspect, the revenue enhancement includes faster site integration time, enhanced network performance, rapid integration of acquisition and faster order to cash. The cost reduction includes duplication reduction, rationalization of distribution facility, rationalization of procurement operations, simplified processes and rationalization of transportation. The capital reduction includes reduced inventories due to faster processing times based on performance data of a failed item/object, and appropriate utilization of manufacturing capacity by procuring a suitable replacement object/item.

In an embodiment, the AI, blockchain and IOT based system enhances procurement operations in supply chain management including requisition, spend analysis, sourcing, Contracts, procure to pay (P2P), supplier management, Invoice management etc. It shall be understood to a person with ordinary skill in the art that the procurement operations may include other operations not listed above.

In a related embodiment, the performance data analysis of an item/object used to replace the item on failure/dysfunction enables raising requisition for appropriate item based on desired optimization characteristic in the required item. Further, spend analysis based on adequate costs for required item enables accurate results in determining appropriate spend of a company from different environments as the items being ordered based on the optimization characteristics are determined considering the working environment for the procured item.

In an embodiment, the working environment may include humidity, temperature, operational hours etc.

In an embodiment, the inventory management operation at a warehousing includes scanning of a set of received goods by at least one IOT device and transmitting the characteristic/specification data and specific warehousing data of the scanned item/object to the at least one server for blockchain network, creating receipts, labels and notifications and storing in blockchain network.

In example embodiments, the system of the present invention utilizes a bot to automate the entire process of replacing an item upon failure by communicating with various elements of the system like the blockchain network, AI engine, IOT devices and processor for determining optimization characteristics required in a replacement item to be deployed in place of the failed item.

Various parameters like the performance data of the failed item, working parameters of plurality of other items coupled to the failed item, working environment conditions etc. are analyzed and using prediction algorithm an appropriate replacement item is determined.

In an embodiment the bot is a software bot or a combination of a software and hardware bot. In an embodiment, the software bot is a computer program enabling a processor to perform various tasks like monitoring item and analysis of data by utilizing AI.

In another embodiment, the bot as a combination of hardware and software, where the hardware includes memory, processor, controller and other associated chipsets especially dedicated for performing functions that enable automation of the entire process to replace an item upon failure.

In many embodiments supply chain operation require a finite amount of processing time on a computer processor. Many embodiments of the invention restrain the supply chain management operations using AI, IOT and blockchain network for monitoring, analyzing and determining characteristics required in an item/object for enhancing the longevity at work in a real working environment for the item/object. Many example systems of the invention use AI to select the fastest processing route for the analysis of a failed item while simultaneously satisfying the needs of obtaining accurate results, data elements are organized/processed depending on the demands of the computing resources, which allow more supply chain management functions like contract management etc. to be processed with same resources (e.g., disk space, processor speed, memory, etc.). Thus, the net result of some of the disclosed systems provide improved processing and functioning of AI and IOT based systems with blockchain networks. The logical processes involved with the assessment of performance data of the failed item along with other coupled items to determine optimization characteristic of a replacement item 110b by utilizing a prediction algorithm defines at least one of the improvements.

Referring to FIG. 1, the various elements like the support architecture 104 and the memory data store 106 are shown as external connections to the server 103 in accordance with an embodiment of the invention. However, it shall be apparent to a person skilled in the art that these elements may be part of an integrated server system. Also, some of the sub-elements of the support architecture 104 and the memory data store 107 either alone or in various combinations may be part of a server system as other external connections.

Various computing devices referred to as IOT devices the entity machines, server, processor etc. of the present invention are intended to represent various forms of digital computers, such as laptops, desktops, workstations, personal digital assistants, and other appropriate computers. Computing devices of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the AI based processing logic integrates deep learning, prediction analysis, information extraction, planning, scheduling, optimization and robotics for processing the supply chain management operations by a control unit.

In an embodiment, the prediction algorithm is dynamically created based on AI based processing of data by using bots. The bot analyzes data such as performance data of failed item and other connected items, working environment data, activity diagrams linking the failed items and other connected items, sequence diagrams and behaviors of the system under different working conditions for creating the algorithm. The bot analyzes data and processes the received data based on the various characteristics associated with the items/objects like location, associated functions with other items, processing time of the functions in combination with multiple items and probability of combining of a replaced required item/objects to execute the work with reduced steps in finite time.

In an example embodiment, the data elements required for determining optimization characteristics of a replacement item/object can be obtained from performance data gathered through TOT devices like sensors, smartphones, smartwatches etc., that are in communication with the server and stored in blocks as part of the blockchain network.

In an example embodiment, the complexity involved in determining optimization characteristic of an item/object require systems and methods that process data in reduced timelines with accuracy. Various operations like monitoring, analysis of performance data of multiple items, processing of working environment data etc., are utilized to gather relevant information for determining optimization characteristics of an item when a failure occurs. An organized data related to a procured item/object is stored in a blockchain in real time instead of just a raw data, thereby reducing time for the final processing of data in case of failure of an item. Further, the volume of data to be processed at the time of failure/dysfunction is less thereby increasing the response time for determining the desired optimization characteristics in a required item/object. The above process when executed in an integrated manner, do not merely perform the functions that each operation would perform separately. Also, the various data are integrated to achieve faster processing times, for example, during a procurement operation. The various data elements described above are reusable at a later stage since the data is an organized data stored in linked blocks of a blockchain network.

Blockchain Network & AI

In an embodiment, the block chain distributed network of the invention includes a plurality of linked data blocks forming a blockchain with multiple branches configured for storing specification/characteristic data of the plurality of items/objects/direct materials procured. The data blocks include information related to working environment of the items/objects/direct materials, performance data of the items/objects being tracked and recorded in blocks. The blockchain distributed network also includes at least one element each connected to the multiple branches of the blockchain for storing dynamically changing performance data and the optimization characteristics of the plurality of items wherein the data and characteristics change when at least one item/object of the plurality of items is replaced by at least one required item/object after dysfunction. The at least one AI engine analyzes the performance data of the item with the required item to determine the at least one element to which the specification data, optimization characteristics and performance data of the item with the required item is to be appended. Further, the data blocks also include information about the contracts signed with a supplier providing the items after procurement.

Figure 2:
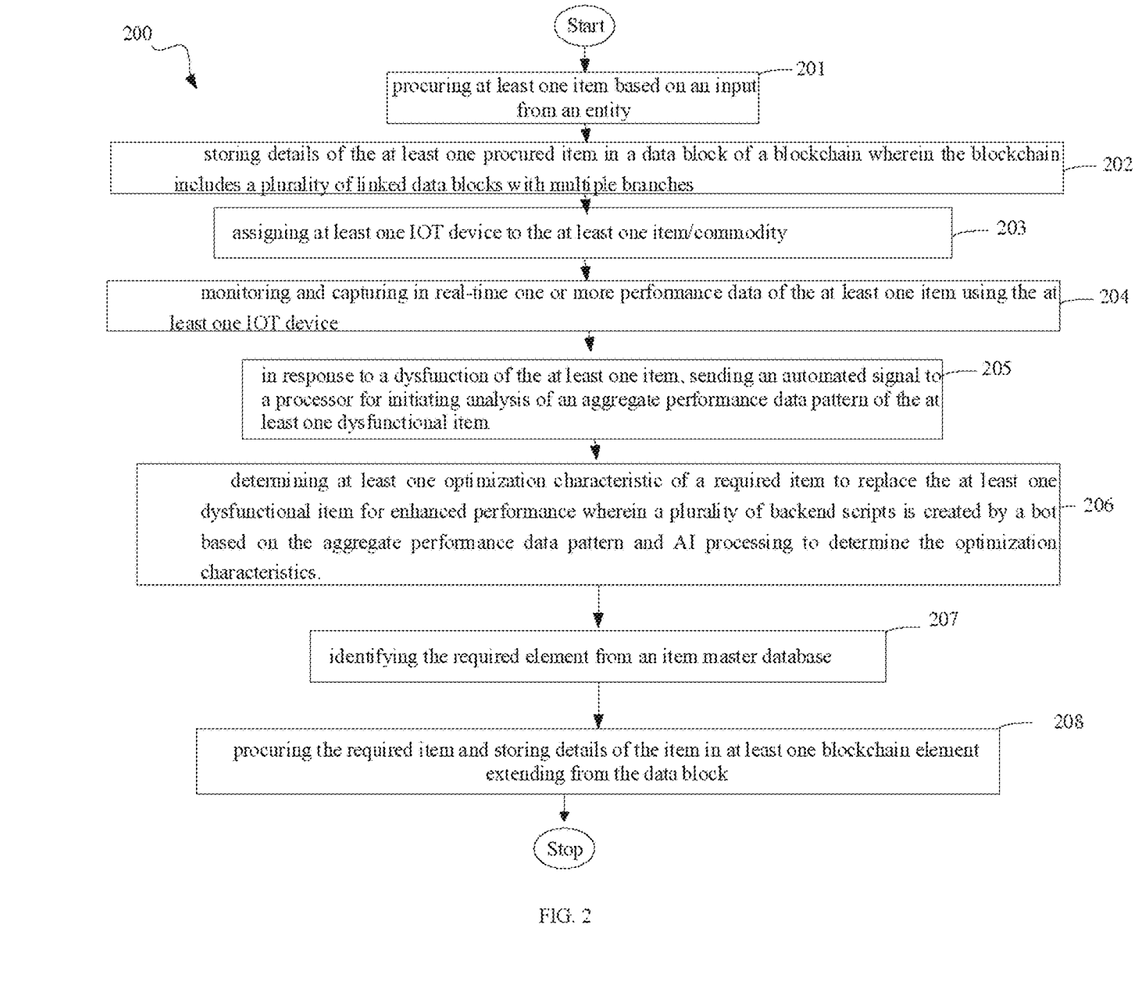
FIG. 2 is a flowchart depicting a method of operating a supply chain management system in accordance with an embodiment of the invention.

Referring to FIG. 2, a flowchart 200 depicting a method of operating a supply chain management system is provided. The method includes the steps of S201 procuring at least one item based on an input from an entity. In S202 storing details of the at least one procured item in a data block of a blockchain, where the blockchain includes a plurality of linked data blocks with multiple branches. In S203 assigning at least one IOT device to the at least one item. In S204 monitoring and capturing in real-time one or more performance data of the at least one item using the at least one IOT device. In S205 in response to a dysfunction of the at least one item, sending an automated signal to a processor for initiating analysis of an aggregate performance data pattern of the at least one dysfunctional item. In this step, the at least one IOT device may send the automated signal to the processor. Further, non-receipt of data from the at least one item by the at least one TOT device may indicate the at least one item is dysfunctional which may cause the at least one TOT device to send the automated signal to a processor. In response, the processor, in a nonlimiting example embodiment, may check for the functioning of the TOT device before undertaking any additional steps. For example, the processor may send an electronic signal to the at least one TOT device to force the TOT device to send a response signal. If the response signal is not received, the server may assume the at least one item is functioning and the failure is associated with the at least one TOT device in which case the processor may cause a signal to be sent to the operator of the at least one TOT device to check that status thereof. In S206, determining at least one optimization characteristic of a required item to replace the at least one dysfunctional item for enhanced performance wherein a plurality of backend scripts is created by a bot based on the aggregate performance data pattern and AI processing to determine the optimization characteristics. In S207 identifying the required item from an item master database and in S208 procuring the required item and storing details of the item in at least one blockchain element extending from the data block.

In an exemplary embodiment, a method of supply chain management based on block chain network is provided. The method includes raising a requisition for procurement of an object and storing information including characteristic, purchase, supplier and other related object information in a data block. The procured object is placed in the work environment and linked with plurality of TOT devices including sensors for monitoring the functioning of the procured object. In case the procured object or any component of the procured object fails, a signal is sent to at least one server informing the same and an AI based analysis is initiated for determining the factors/reasons responsible for failure of the procured object. Based on the analysis the optimization characteristic required in a replacement object for ensuring enhanced performance is determined. The item master database is utilized to determine information about available replacement objects with the desired characteristics.

Figure 3:
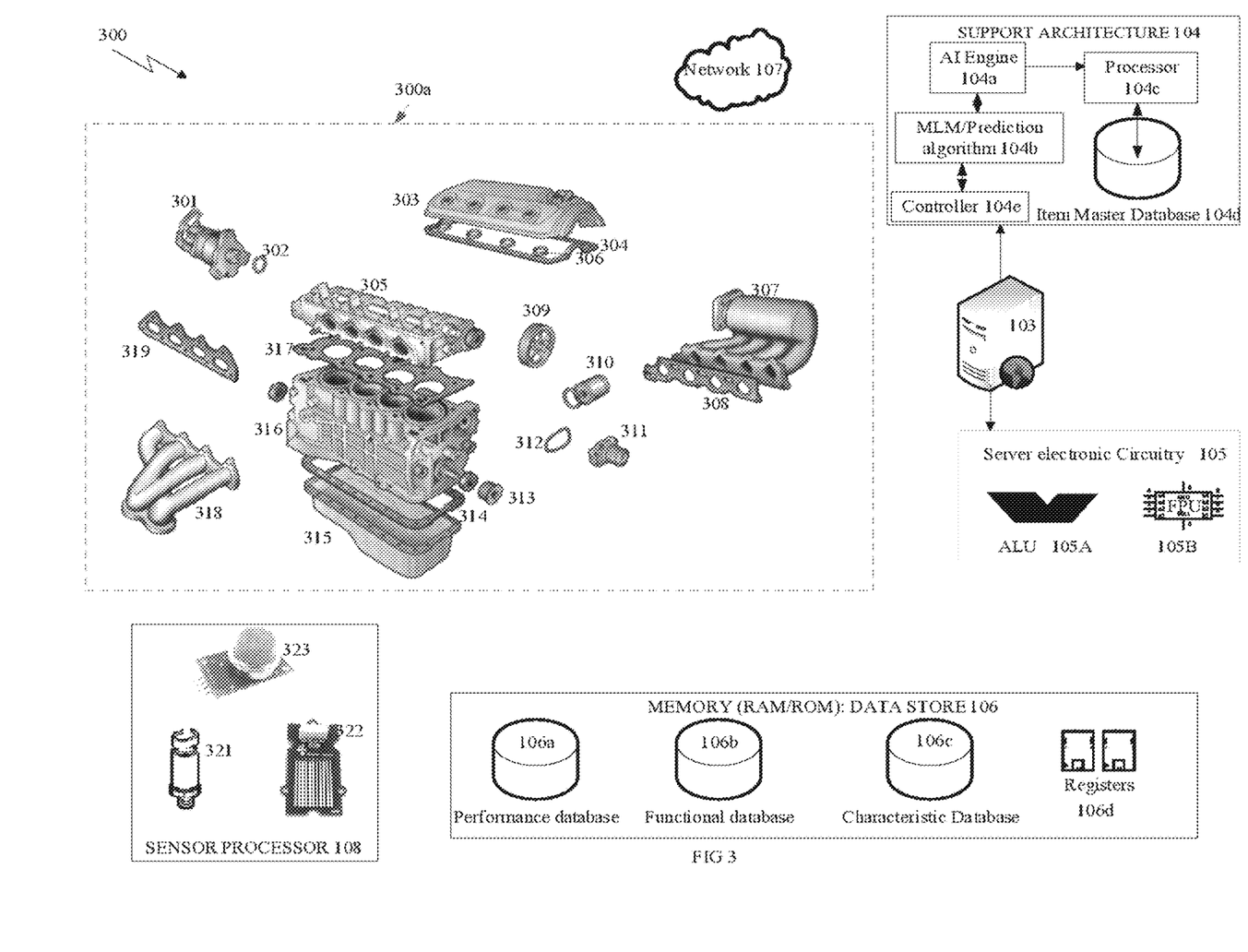
FIG. 3 is a view of an AI, IOT and blockchain based supply chain management system applicable for automobile industry in accordance with an embodiment of the present invention.

In an example embodiment a supply chain management system for procurement of automobile or airplane components like Engine etc. Referring to FIG. 3, a supply chain management system 300 applicable for automobile industry is provided and shown. Consider procurement of automobile component like engine 300a with sub components including but not limited to Distributor 301, distributor O-ring 302, Cylinder head cover 303, cylinder head cover Gasket 304, cylinder head 305, rubber grommets 306, intake manifold 307, intake manifold gasket 308, camshaft pulley 309, oil filter 310, water pump 311, water pump gasket 312, timing belt drive pulley 313, oil pan gasket 314, oil pan 315, engine block 316, head gasket 317, exhaust manifold gasket 318, and exhaust manifold 319. The sub components of the engine 300a are connected to IOT network 320 having a plurality of sensors like water sensor 321, gas sensor 322, oil pressure sensor 323 etc. These sensors are configured to monitor and capture performance data of the engine 300a and its subcomponents like water pump 311, oil filter 310 etc. If any of the sub components fails then the sensor detects the fault and sends a signal to the server. The work environment parameters and sub components connected to the failed components are assessed along with other factors in an AI based analysis for determining the reasons/cause of the failure. For eg., if the oil filter pressure varies due to increase in the working environment temperature during a particular operation, thereby affecting the performance of the engine and other related sub components or causing damage to the other sub components. Based on the analysis the optimization characteristic required in a replacement oil filter for ensuring enhanced performance is determined. The item master database is utilized to determine information about available oil filters with the desired characteristics. Also, compatibility with other sub-components is analyzed and new replacement sub components are proposed to ensure longevity of working of the engine in the working environment. Further, any subcomponents that may have been affected by the faulty oil filter are analyzed to be replaced and matched with the optimization characteristics of the oil filer to ensure enhanced performance of the engine.

The specification/characteristic data of the replaced oil filter and other sub components of the engine are stored in the linked data blocks of the blockchain distributed network. The data blocks include information related to working environment of the oil filter, and other subcomponents of the engine, performance data of the subcomponents being tracked and recorded in blocks. The blockchain distributed network also includes at least one element each connected to multiple branches of the blockchain for storing dynamically changing performance data of the oil filter and the optimization characteristics of the engine sub components wherein the data and characteristics change when the oil filter of the engine is replaced by another after dysfunction. The AI engine analyzes the performance data of the oil filter with the replaced oil filter to determine the at least one element to which the specification data, optimization characteristics and performance data of the required filter is to be appended.

In an exemplary embodiment, the performance data of an item is a parameterized performance data. For example, in case of an oil filter, the parameters by which it can assess the performance are capacity, efficiency and pressure drop. The performance of the oil filter is assessed based on the practical/working condition values of these parameters with the ideal values to assess the performance.

In an exemplary embodiment the AI engine comprises of Machine learning models that are fully automated in terms of feedback of responses along with the operating characteristics and material specifications continuously. The Machine learning model is a supervised learning model that is trained on multiple attributes mainly material specifications of items in an assembly and the operating characteristics of the systems. The invention utilizes supervised learning techniques like artificial neural networks. The primary output of the models is prediction i.e. predicting whether an item will fail under specific operating conditions. The machine learning models also is able to capture the correlation between multiple sub components of the system and determining the causal drivers behind a particular rejection/failure. The system may use the equation:

Output $Y=1$ or $0$ (failure or non-failure)

$Y=f(x_1, x_2, \ldots x_n)$ where, $x_1$=temperature, $x_2$=pressure, $x_3$=material spec 1 etc.

The machine learning models enables appropriate analysis and determination of desired characteristic item to replace a dysfunctional item. The present invention includes exception testing to measure items to say if entire lot is fine. The entire system enables maintaining appropriate inventory of items without wasting space, money and time.

In an exemplary embodiment, in large organization a high scale failure across the organization can be captured. The invention analysis multiple parameters like material manufacturer, environmental condition, performs linear regression on characteristics of the item etc. to provide appropriate required item characteristics.

Smart Contract and Blockchain

In an embodiment the blockchain network includes smart contract configured to be executed after alteration depending on the change in the characteristics of the replacement object to be procured. In case of an oil filter of the engine, once the system identifies replacement object optimization characteristics and additional sub components to be replaced to ensure enhanced performance of the engine after replacement of the components, then a Smart Contract can enable faster and easier procurement of the required components.

In another embodiment, for replacement of objects and sub components with a desired set of components, a fresh contract process may have to be undertaken with a new supplier who is able to deliver the required objects. Once the optimization characteristics of the required objects are determined, the details of the object are automatically entered based on the information in the blockchain network and a new Smart Contract is created. Once a supplier is willing to provide the requisite objects/sub components at a price mentioned in the smart contract, the supplier shall express interest and sign the contract automatically by digital signature. On signing of the contract, the supplier shall deliver the requisite objects/sub components to the desired location of the buyer. After delivery of the objects the payment for the same shall be automatically released in the account of the supplier as mentioned in the contract. A receipt is generated and saved in the blockchain network with order details, items procured etc. In a contract the verification and authentication of the deal is the most important aspect. Since, the smart contracts are signed through the blockchain network, the contract is verified by each node on the blockchain network checking if the buyer making a request is genuine, the buyer has enough money to pay the supplier, whether the supplier has enough inventory and actually own the objects being delivered by the supplier. If the network agrees, that all conditions are true, the buyer gets access to a passcode for release of the required objects. It shall be apparent to a person skilled in the art that a node is a device or an individual part of the larger data structure that is a blockchain.

Smart Contract, Blockchain & IOT

In a related embodiment, for replacement of objects and sub components with a desired set of components, a fresh contract process or alteration in the process may have to be undertaken with an old supplier who is able to deliver the required objects. Once the conditions are satisfied and a deal is signed between the buyer and supplier, a 3D printer connected to the IOT network and the blockchain network prints the at least one required item depending on the specification data, optimization characteristics and performance data of the dysfunctional item, and a specification data of the required item. The specification data of the required item is determined based on the analysis of the performance data of the item and the dysfunctional item along with the information about working environment as stored in the data blocks of the blockchain network.

In an embodiment the 3D printer is locked for printing the required objects until an authorization passcode is entered for the printer to enable printing. The passcode is shared with the buyer through the blockchain network once the smart contract is signed between the buyer and supplier. The buyer instructs the 3D printer through an IOT device like a smart watch for printing the object.

In an advantageous aspect, the blockchain network ensures security, authenticity, self-verification, self-execution and tamper resistant transactions. For eg. the authenticity of the supplier providing the replacement object and the fact that the supplier is the actual owner can be verified because the entire transaction takes place through a blockchain network with all details of the objects being supplied including manufacturer details, specification data, authorized supplier detail etc. Further, the object being procured is of the desired configuration is ensured due to the blockchain network authentication as matching of the ordered object and the delivered object takes place without any human intervention.

In another embodiment the blockchain network of the system also ensures the AI based engine is configured to analyze supplier performance in real time and raise alerts when it is un-aligned with a contract.

In an exemplary embodiment the present invention includes a suppler intelligence platform for supporting the various functions carried out by AI, IOT and blockchain based systems. The platform collects data from different sources such as customer data, supplier onboarding data, data from social media into a data repository and enables more accurate forecasting, budgeting, Commodity management including pricing, variance, supplier Risk and performance management and other benefits. More particularly, the suppler intelligence platform enables the prediction algorithm to identify appropriate supplier capable of supplying a required product.

In an example embodiment, the complexity involved in execution of various supply chain management operations require systems and methods that process these operations in reduced timelines with accuracy. Various supply chain operations like spend analysis, procurement, and inventory management, etc., when executed in an integrated manner, do not merely perform the functions that each operation would perform separately. Also, the items being procured, their characteristics and performance in adverse working environment/conditions are determined to estimate desired replacement item which is utilized across different functions of a supply chain management platform thereby achieving faster processing times, economic significance with reduced inventory requirement. Consider, for example, a procurement operation with spend analysis, contract management, and inventory management as different operations. The AI in a nonlimiting example of the present invention predicts the characteristic of the item to be procured for enabling the item to sustain for longer in the practical working environment/condition. Also, combining two or more operations leads to performance of another scenario i.e the combination of operations contributes towards performance of another operation. In the above example, consider Spend analysis that allows determination of a company's spending towards procurement of any item/product. If the desired characteristics of an item to be procured that would be suitable for a particular working environment is known, it would considerably reduce the spend of a company who would otherwise spend more in procuring items with different characteristics. Requisition/PO as an operation raises a requisition based on the demand of an item/product and provide the Purchase order which goes through different approval process based on certain rules. However, in case of combining these operations for another operation, say inventory management, certain factors are considered for assessing the quantity of items that can be procured and kept for replacement, i.e. the information about right item to be procured, spend and budgeting information of a company to know the kind of requisitions that can be approved before an invoice is raised. When these operations function independently, the requisition may not consider the type of item or its characteristics. These operations when integrated do not merely perform the function that they perform when functioning independently as the items being procured and their associated characteristics along with the working environment/condition are determined to estimate the life cycle of the item being procured. The AI based system considers all the factors for automatically determining the characteristics of a replacement item to reduce the time required for processing any of the above operation or combination thereof.

Exemplary embodiments of the present invention, may be a system, a method, and/or a computer program product. The computer program product may include a computer readable storage medium (or media) having computer readable program instructions thereon for causing a processor to carry out aspects of the present invention including but not limited to processing prediction algorithm, determining optimization characteristics based on performance data etc. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device, for example, it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A method of operating a supply chain management system, the method comprising:
procuring at least one item based on an input from an entity;
storing details of the at least one procured item in a data block of a blockchain, wherein the blockchain includes a plurality of linked data blocks with multiple branches;
assigning at least one internet of things device to the at least one item;
monitoring and capturing in real-time one or more performance data of the at least one item using the at least one internet of things device;
transmitting and storing the captured one or more performance data in the data block;
in response to a dysfunction of the at least one item, sending an automated signal to a processor for initiating analysis of an aggregate performance data pattern of the at least one dysfunctional item;
determining at least one optimization characteristic of a required item to replace the at least one dysfunctional item for enhanced performance, wherein a plurality of backend scripts used by the processor to determine the at least one optimization characteristic of the required item to replace the at least one dysfunctional item is created by a bot based on the aggregate performance data pattern and artificial intelligence processing to determine the at least one optimization characteristic;
identifying, by the processor, the required item from an item master database; and
procuring the required item and storing details of the item in at least one blockchain element extending from the data block.

2. The method of claim 1, wherein the at least one optimization characteristic is determined using at least one AI engine coupled to the processor configured to process a prediction algorithm based on the analyzed aggregate performance data pattern, wherein the artificial intelligence engine includes machine learning models created with supervised learning technique.

3. The method of claim 2, further comprising: the processor determining the at least one optimization characteristic by analyzing impact of a plurality of neighboring items on the at least one dysfunctional item and analyzing the performance data of the at least one dysfunctional item that enables creation of the aggregate data pattern by the artificial intelligence engine based on artificial intelligence based dynamic processing logics, wherein the AI engine utilizes dynamically created prediction algorithm to determine optimization characteristics with reduced processing times using a bot.

4. The method of claim 3, wherein the artificial intelligence engine-based processing logic integrates deep learning, predictive analysis, information extraction, planning, scheduling, impact analysis and robotics for analysis of the aggregate data patterns to determine the at least one optimization characteristic.

5. The method of claim 2, wherein the required item is identified from the item master database using the artificial intelligence engine and the database includes a consolidated list of items from multiple suppliers.

6. The method of claim 1, wherein the blockchain element is connected to the data block of the blockchain for storing dynamically changing one or more performance data of the at least one item.

7. The method of claim 2, wherein the artificial intelligence engine runs the prediction algorithm based on the performance data pattern of the at least one dysfunctional item, a working environment data of the item, for determining the optimization characteristics of the required item.

8. The method of claim 7, wherein the environment includes humidity, temperature, operational hours.

9. The method of claim 5, further comprising the steps of:
sending an alert signal to the processor in case the at least one dysfunctional item was procured from a supplier present in a reject list; and
identifying a new supplier for procuring the required item.

10. The method of claim 1, wherein a monitoring engine is configured to learn the performance data pattern of the at least one item in the working environment based on the performance data.

11. The method of claim 10, wherein the block chain including the data block receives the performance data from the internet of things devices for analysis to determine aggregate data patterns based on artificial intelligence based prediction algorithm to determine optimization characteristics of the required item.

12. A supply chain management system comprising:
a cloud based internet of things network including:
a plurality of internet of things devices in communication with each other, wherein the devices are configured for tracking, capturing, processing, transmitting and receiving performance data of a plurality of items procured through a supply chain network; and
at least one server having at least one artificial intelligence engine configured to process performance data received from the plurality of internet of things devices to identify a data pattern for determining optimization characteristics of the plurality of items, wherein a plurality of backend scripts is created by a bot based on the data patterns and artificial intelligence processing for determining the optimization characteristics;
and
a cloud based internet of things network having a blockchain distributed network, wherein the blockchain distributed network includes
a plurality of linked data blocks forming a blockchain with multiple branches configured for storing details of the plurality of items;
wherein the data blocks include information related to working environment of the plurality of items, performance data of the plurality of items being tracked and recorded in blocks;
at least one element each connected to the multiple branches of the blockchain for storing dynamically changing performance data and the optimization characteristics of the plurality of items, wherein the performance data and characteristics change when at least one item of the plurality of items is replaced by at least one required item after dysfunction.

13. The system as claimed in claim 12, wherein the at least one artificial intelligence engine is configured to compare the performance data with a specification data associated with the plurality of items at manufacture, wherein the artificial intelligence engine includes machine learning models created with supervised learning technique.

14. The system as claimed in claim 12 further comprising: a printer connected to the internet of things network, wherein the printer is configured for printing the at least one required item depending on the specification data, optimization characteristics and performance data of a dysfunctional item and a specification data of the at least one required item, wherein the specification data of the at least one required item is determined based on the analysis of the performance data of the item on dysfunction along with information about working environment as stored in the data blocks of the blockchain network.

15. The system as claimed in claim 12, wherein the at least one element is an extension of the blockchain to accommodate for data of the at least one required item without removing, modifying or altering the specification data of the plurality of items.

16. The system of claim 12, wherein at least one of the plurality of items is a single component or an assembly of sub components combined to produce the at least one of the plurality of items.

17. The system of claim 12, further comprising: a support architecture including a controller encoded with instructions enabling the controller to function as the bot configured to generate the plurality of scripts created for determining optimization characteristic for the at least one required item based on the prediction algorithm.

18. The system of claim 12, wherein the artificial intelligence engine-based processing logic integrates deep learning, predictive analysis, information extraction, planning, scheduling, impact analysis and robotics for analysis of the data patterns to determine the optimization characteristics.

* * * * *